United States Patent
Katsuno et al.

(10) Patent No.: US 9,233,514 B2
(45) Date of Patent: Jan. 12, 2016

(54) TIRE MOLD, TIRE, AND TIRE MANUFACTURING METHOD

(71) Applicant: BRIDGESTONE CORPORATION, Chuo-Ku, Tokyo (JP)

(72) Inventors: Hiroyuki Katsuno, Setagaya-ku (JP); Ryoichi Watabe, Nakano-ku (JP); Masahiro Katayama, Tokorozawa (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/118,085

(22) PCT Filed: Dec. 28, 2012

(86) PCT No.: PCT/JP2012/084304
§ 371 (c)(1),
(2) Date: Nov. 15, 2013

(87) PCT Pub. No.: WO2013/100197
PCT Pub. Date: Jul. 4, 2013

(65) Prior Publication Data
US 2014/0190608 A1  Jul. 10, 2014

(30) Foreign Application Priority Data
Dec. 28, 2011 (JP) .................. 2011-289129

(51) Int. Cl.
*B29D 30/06* (2006.01)
*B60C 11/00* (2006.01)
(Continued)

(52) U.S. Cl.
CPC .......... *B29D 30/0606* (2013.01); *B29C 33/424* (2013.01); *B29D 30/0662* (2013.01); *B60C 11/00* (2013.01); *B60C 11/13* (2013.01); *B29D 2030/0612* (2013.01); *B29D 2030/0616* (2013.01); *B29L 2030/00* (2013.01)

(58) Field of Classification Search
CPC ............. B29D 30/66; B29D 2030/662; B29D 2030/667; B29D 30/0601; B29D 30/0606; B29D 30/0662; B29D 2030/0612; B29D 2030/0616
USPC ..................................... 425/28.1; 152/209.15
See application file for complete search history.

(56) References Cited

U.S. PATENT DOCUMENTS 3,327,570 A * 6/1967 McClarran ................... 76/107.1
4,021,168 A * 5/1977 Dailey ......................... 425/28.1
(Continued)

FOREIGN PATENT DOCUMENTS

CN   101372194 A   2/2009
CN   101970176 A   2/2011
(Continued)

OTHER PUBLICATIONS

Machine generated English language translation of JP 07-76202 (original document dated Mar. 1995).*
(Continued)

*Primary Examiner* — Martin Rogers
(74) *Attorney, Agent, or Firm* — Sughrue Mion, PLLC

(57) ABSTRACT

The tread surface of a tire according to the present invention is molded with a tire mold having a tread molding surface, and at least a portion of the tread molding surface is formed by projecting spherical projection material having a predetermined sphericity and causing the spherical projection material to collide.

5 Claims, 4 Drawing Sheets

(51) Int. Cl.
    *B60C 11/13* (2006.01)
    *B29C 33/42* (2006.01)
    *B29L 30/00* (2006.01)

(56) References Cited

U.S. PATENT DOCUMENTS

| | | | |
|---|---|---|---|
| 5,409,415 A * | 4/1995 | Kawanami et al. | 451/39 |
| 2008/0035021 A1* | 2/2008 | Sambasivan et al. | 106/286.5 |
| 2009/0049717 A1 | 2/2009 | Kayashima | |
| 2011/0053463 A1 | 3/2011 | Beaudonnet | |
| 2011/0297288 A1 | 12/2011 | Ohara | |
| 2013/0068363 A1* | 3/2013 | Ikemura | 152/450 |
| 2013/0244429 A1 | 9/2013 | Wan et al. | |

FOREIGN PATENT DOCUMENTS

| | | | | |
|---|---|---|---|---|
| DE | 37 36 855 A1 | | 5/1989 | |
| DE | 3736855 | * | 5/1989 | B60C 11/00 |
| JP | 07-76202 | * | 3/1995 | B60C 11/00 |
| JP | 2782551 | * | 5/1998 | B60C 11/00 |
| JP | 11-301217 A | | 11/1999 | |
| JP | 2002-192914 A | | 7/2002 | |
| JP | 2003-300214 A | | 10/2003 | |
| JP | 2009-67378 A | | 4/2009 | |
| JP | 2009-190526 A | | 8/2009 | |
| WO | 2011/118856 A1 | | 9/2011 | |
| WO | WO 2011/118856 | * | 9/2011 | B60C 11/00 |

OTHER PUBLICATIONS

Machine generated English language translation of JP 2782551 (original document dated May 1998).*
Progressive Surface "What is Shot Peening?" http://www.progressivesurface.com/shotpeening_process.php Apr. 2010.*
Machine generated English language translation of DE 3736855 (original document dated May 1989).*
International Search Report for PCT/JP2012/084304 dated Apr. 16, 2013.
Chinese Office Action, dated Apr. 14, 2014, issued in corresponding Chinese Patent Application No. 201280017791.8.
Extended European Search Report issued in European Application No. 12862010.1 dated Aug. 19, 2014.
Communication dated Feb. 16, 2015, issued by the State Intellectual Property Office of the People's Republic of China in corresponding application No. 201280017791.8.
Communication dated Sep. 23, 2015 from the State Intellectual Property Office of the P.R.C. in counterpart application No. 201280017791.8.

* cited by examiner

TIRE MOLD, TIRE, AND TIRE MANUFACTURING METHOD

TECHNICAL FIELD

The present invention relates to a tire mold, tire, and tire manufacturing method.

BACKGROUND ART

In the past, a variety of approaches have been taken with winter tires in order to improve on-ice performance and on-snow performance.

For example, JP2002-192914A (PTL 1) proposes a technique for providing a plurality of sipes on each block formed in the tread portion in order to increase the edge component in the tire ground contact area while also improving snow-biting and improving driving performance of the tire on icy and snowy roads (frozen roads and roads with accumulated snow).

On the other hand, JP11-301217A (PTL 2), for example, proposes a technique for a tire having tread rubber with a so-called cap and base structure formed by cap rubber and base rubber. By using foam rubber as the cap rubber, this technique greatly improves water drainage and improves on-ice performance and on-snow performance.

Furthermore, JP2009-067378A (PTL 3), for example, proposes a technique related to surface properties of a tread portion 1 of a tire, as illustrated in FIG. 1A. This technique improves on-ice performance and on-snow performance of the tire by providing protrusions 2 with a pointed edge on the surface of the tread portion in order to increase the surface roughness and increase the frictional force between the tire surface and the road surface.

CITATION LIST

Patent Literature

PTL 1: JP2002-192914A
PTL 2: JP11-301217A
PTL 3: JP2009-067378A

SUMMARY OF INVENTION

With the technique for providing sipes in a block disclosed in PTL 1, however, if the number of sipes becomes too large, block rigidity decreases, making it easier for blocks to collapse. This leads to the problem of reduced tire ground contact area, which ends up lowering the on-ice performance and on-snow performance.

On the other hand, with the technique disclosed in PTL 2 to use foam rubber in the cap rubber, the rigidity of the entire block may decrease due to the use of foam rubber, and therefore the wear resistance of the tire is not necessarily sufficient.

Furthermore, with the technique disclosed in PTL 3 to provide protrusions with a pointed edge on the surface of the tread portion, the rigidity of the protrusions is low, and therefore particularly when a large load is applied on the tires, such as during an increased load on the front wheels due to the vehicle nose-diving, the protrusions may be crushed, preventing the desired performance from being obtained. In other words, with the technique to provide protrusions with a pointed edge on the surface of the tread portion, the protrusions 2 may be crushed due to contact with the road surface T, as illustrated in FIG. 1B, causing a decrease in the volume of cavities 3 for water drainage, thereby worsening water drainage. As a result, the desired on-ice performance and on-snow performance may not be obtained. Accordingly, the technique disclosed in PTL 3 has room for further improvement of on-ice performance and on-snow performance. The inventors repeatedly examined tires using the techniques disclosed in PTL 1 to 3 and further discovered that, while the reason is unclear, such conventional tires have the problem that on-ice performance and on-snow performance are not sufficiently obtained particularly for newly produced tires. Accordingly, the techniques disclosed in PTL 1 to 3 have room for improvement of on-ice performance and on-snow performance particularly for newly produced tires.

In order to resolve the above problems, it is an object of the present invention to provide a tire with improved on-ice performance and on-snow performance, a tire mold used for manufacturing (molding) the tire, and a method for manufacturing the tire.

The inventors thoroughly investigated how to solve the above problems.

As a result, the inventors made a discovery related to a method for manufacturing a tire that can obtain tread surface properties that guarantee water drainage without lowering block rigidity, thus leading to the completion of the present invention.

The present invention is based upon the above discovery, and the main features thereof are as follows.

A tire mold according to the present invention includes a tread molding surface to mold a tread surface of a tire, and at least a portion of the tread molding surface is formed by projecting spherical projection material having a sphericity of 15 µm or less and causing the spherical projection material to collide.

The mold obtained in this way can mold a tire having predetermined tread surface properties in order to improve the on-ice performance and on-snow performance of the tire.

Here, the "sphericity" refers to a value calculated by taking a photograph of the projection material with a SEM, selecting any 10 projection material particles, for each particle finding a difference in diameter between an inscribing circle, which is centered around a center of the particle and touches a point of smallest radius of the particle, and a circumscribing circle, which is centered around the center of the particle being measured and contact a point of greatest radius of the particles, then averaging the differences for all 10 particles.

The tread surface of a tire according to the present invention is molded by the above tire mold.

Desired tread surface properties can be obtained in this way, and the on-ice performance and on-snow performance of the tire can be improved.

Furthermore, a method for manufacturing a tire according to the present invention includes the steps of a) forming at least a portion of a tread molding surface of a tire mold by projecting spherical projection material having a sphericity of 15 µm or less and causing the spherical projection material to collide, and b) molding a tire with the tire mold that includes the tread molding surface formed in step a).

In this way, a tire with excellent on-ice performance and on-snow performance can be manufactured.

According to the present invention, a tire with improved on-ice performance and on-snow performance, a tire mold for molding the tire, and a method for manufacturing the tire can be provided.

BRIEF DESCRIPTION OF DRAWINGS

The present invention will be further described below with reference to the accompanying drawings, wherein.

DESCRIPTION OF EMBODIMENTS

The following describes a tire according to an embodiment of the present invention.

Figure 1A:
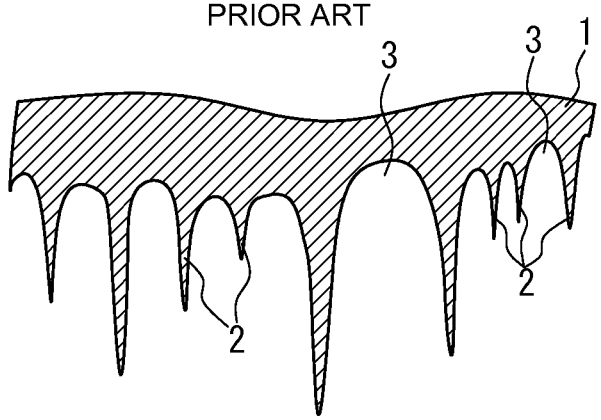
FIG. 1A is a schematic cross-sectional diagram illustrating the tread surface of a conventional tire.
Figure 1B:
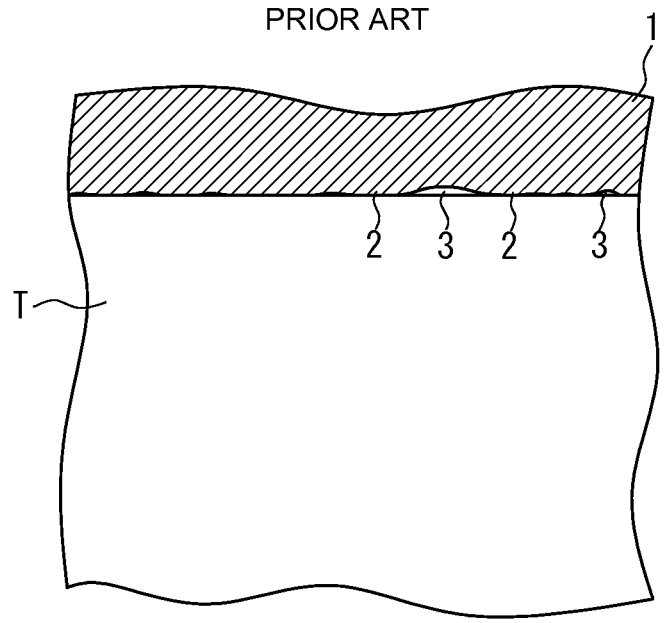
FIG. 1B is a schematic cross-sectional diagram illustrating contact between the tread surface and the road surface when a load is applied on the tire.
Figure 2:
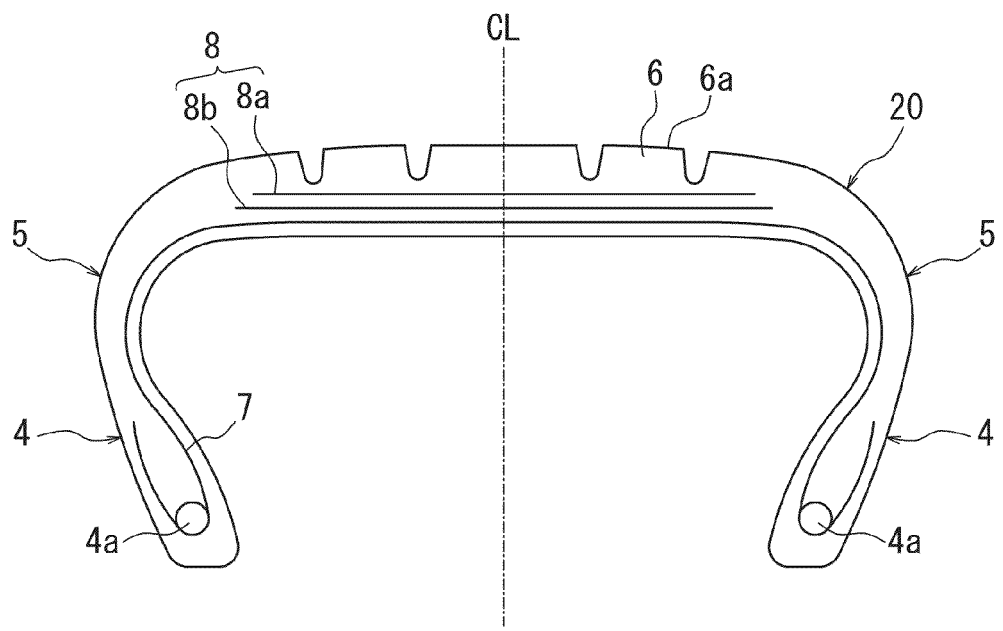
FIG. 2 is a cross-sectional diagram in the tire width direction of a tire according to an embodiment of the present invention.

FIG. 2 is a cross-sectional diagram in the tire width direction of the tire according to an embodiment of the present invention.

As illustrated in FIG. 2, a tire 20 according to the present embodiment includes a pair of bead portions 4, a pair of sidewall portions 5 respectively extending from the bead portions 4 outward in the tire radial direction, and a tread portion 6 extending between the sidewall portions 5.

The tire 20 according to the present embodiment also includes a carcass 7 extending toroidally between a pair of bead cores 4a embedded in the pair of bead portions 4 and a belt 8 formed by two belt layers 8a and 8b disposed outwards in the tire radial direction from the carcass 7. Furthermore, tread rubber formed by non-foam rubber is disposed outwards from the belt 8 in the tire radial direction.

Figure 3:
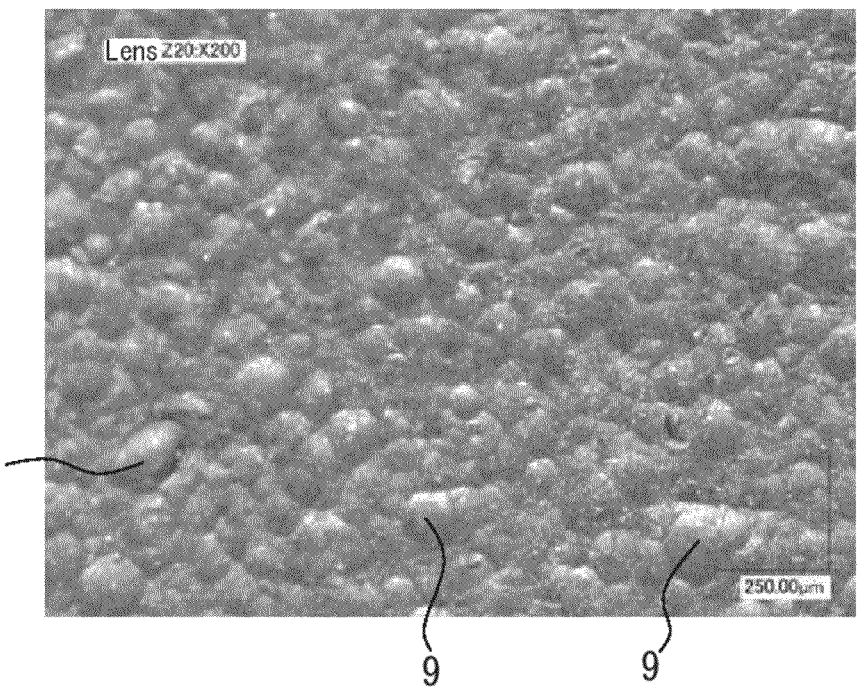
FIG. 3 illustrates an expansion of a portion of the tread surface of the tire according to the present invention.

FIG. 3 is an SEM photograph of the tread surface according to the present embodiment.

As illustrated in FIG. 3, the tire according to the present embodiment includes a plurality of hemispherical protrusions 9 across the entire tread surface.

Figure 4:
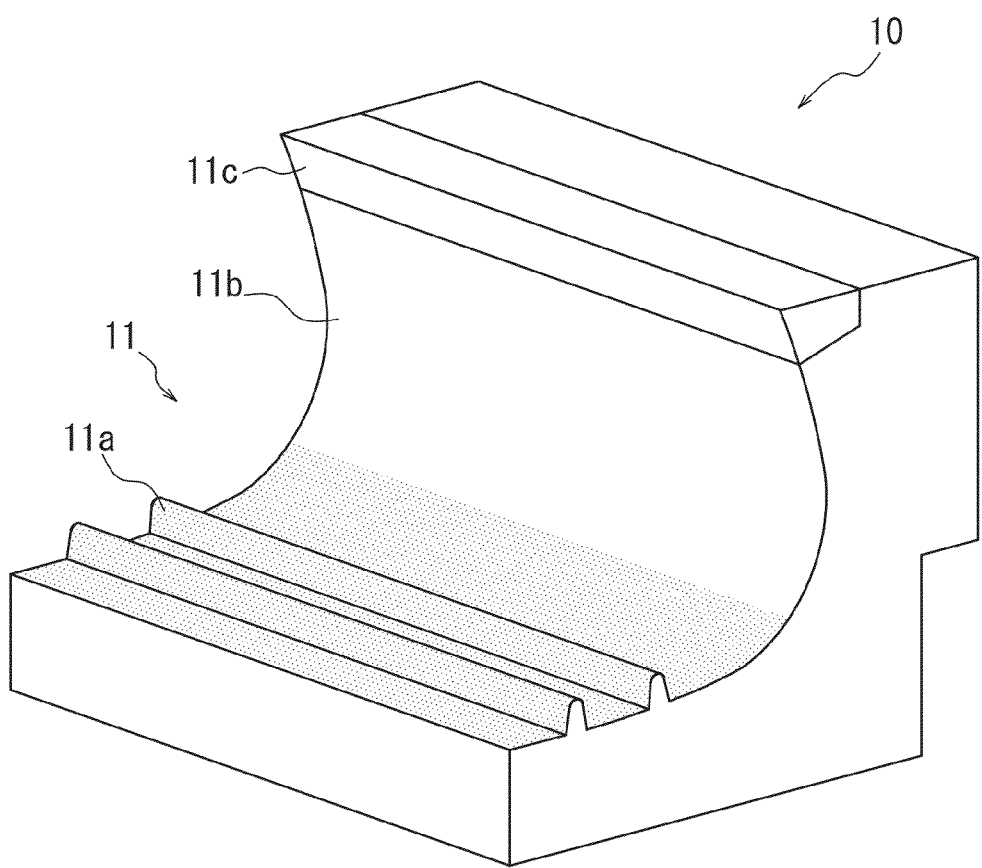
FIG. 4 is a schematic partial perspective view of a portion of a mold used to mold a tire according to the present invention.

FIG. 4 is a schematic partial perspective view of a portion of a mold used to mold a tire according to the present invention.

As illustrated in FIG. 4, this mold 10 includes a molding surface 11 for vulcanizing a tire.

This molding surface 11 includes a tread molding surface 11a that molds the tread surface, and in the example in FIG. 4, also includes a sidewall molding surface 11b that molds the outer surface of the sidewall portion and a bead molding surface 11c that molds the outer surface of the bead portion.

This molding surface 11 is not particularly limited and can for example be formed from aluminum.

The tread surface having protrusions as illustrated in FIG. 3 in the tire according to the present invention can be molded by a tire vulcanization mold 10, as illustrated in FIG. 4, provided with the tread molding surface 11a, which has a plurality of concavities (illustrated schematically by dots in FIG. 4) corresponding in shape to hemispherical protrusions. In other words, in the tire vulcanization step, the hemispherical concave shape of the tread molding surface 11a in the mold 10 is transferred in the shape of protrusions onto the tread surface of the tire.

The following describes a method for forming the tread molding surface 11a in the mold 10.

The tread molding surface 11a can be formed by a projection material projecting step to project projection material having a particular shape and to cause the projection material to collide.

In the projection material projecting step, it is crucial that the tread molding surface 11a (the entire surface or a portion thereof) be formed by projecting spherical projection material having a sphericity of 15 μm or less and causing the spherical projection material to collide.

The reason is that if the sphericity of the projection material exceeds 15 μm, it becomes difficult for the tread molding surface in the mold to adopt a shape including hemispherical concavities, making it difficult to use this mold to obtain desired surface properties for the tread surface of the molded tire.

Since the tire mold obtained by this projection material projecting step includes a plurality of hemispherical concavities along the tread molding surface, a plurality of hemispherical protrusions are formed on the tread surface of a tire vulcanized with this mold.

Therefore, according to a tire molded with this mold, a large volume for water drainage cavities can be guaranteed even when a large load is applied, since the protrusions are spherical, making it easy for force to be applied evenly to the protrusions, resulting in a shape that does not crush easily. The water drainage thus improves, thereby improving on-ice performance and on-snow performance of the tire.

The sphericity of the projection material is more preferably 10 μm or less and even more preferably 5 μm or less.

The reason is that the surface properties on the tread surface of a tire molded with a mold having a tread molding surface obtained in this way improve even more, thereby further improving the on-ice performance and on-snow performance of the tire.

The average particle diameter of the projection material used in the projection material projecting step is preferably from 10 μm to 1 mm.

The reason is that setting the average particle diameter of the projection material to be 10 μm or more allows for desired properties to be obtained for the tread molding surface in the mold and also suppresses the scattering of projection material during projection at high pressure in the projection material projecting step. On the other hand, setting the average particle diameter of the projection material to be 1 mm or less can suppress early wear of the mold surface.

For the same reasons, the average particle diameter of the projection material is more preferably from 20 μm to 0.7 mm and even more preferably from 30 μm to 0.5 mm.

Here, the "average particle diameter" refers to a value calculated by taking a photograph of the projection material with a SEM, randomly selecting 10 projection material particles, for each particle finding an average diameter between an inscribing circle, which is centered around a center of the particle and touches a point of smallest radius of the particle, and a circumscribing circle, which is centered around the center of the particle being measured and contacts a point of greatest radius of the particle, then averaging the average diameter values for all 10 particles.

Note that by setting the distribution of the particle diameter of the projection material used in the projection material projecting step to be 10% to 20% projection material with a diameter of at least 50 μm and less than 200 μm, 50% to 60% projection material with a diameter of at least 200 μm and less than 300 μm, and 10% to 20% projection material with a diameter of at least 300 μm and at most 400 μm yields a tire mold provided with a tread molding surface having convexities with a diameter distribution in the above ranges. Note that the projection material may include particles with a particle diameter of less than 50 μm or more than 400 μm.

Furthermore, the Modified Mohs hardness of the projection material is preferably from 2 to 10.

The reason is that setting the Modified Mohs hardness of the projection material to be 2 or more makes it easier to obtain the desired surface properties in the mold, whereas setting the Modified Mohs hardness of the projection material to be at most 10 reduces early damage to the mold.

For the same reasons, the Modified Mohs hardness of the projection material is more preferably from 3.0 to 9.0 and even more preferably from 5.0 to 9.0.

The Modified Mohs hardness of the tire mold is preferably from 2.0 to 5.0 and the difference between the Modified Mohs hardness of the tire mold and that of the projection material is preferably from 3.0 to 5.0.

Furthermore, the specific gravity of the projection material is preferably from 0.5 to 20.

The reason is that setting the specific gravity of the projection material to be 0.5 or more suppresses scattering of the projection material and improves workability during the projecting step to provide the tread molding surface with desired properties, whereas setting the specific gravity of the projection material to be 20 or less reduces the energy for accelerating the projection material and suppresses early wear of the mold.

For the same reasons, the specific gravity of the projection material is more preferably from 0.8 to 18 and even more preferably from 1.2 to 15.

The type of projection material is not particularly limited, yet the use of zircon, steel, cast steel, ceramic, and the like, for example, is preferable.

In the projection material projecting step, the projection material is preferably projected onto the tread molding surface of the mold for 30 seconds to 10 minutes at a high pressure of 100 kPa to 1000 kPa.

At this point, the distance from the nozzle for projecting the projection material to the tire mold is preferably from 50 mm to 200 mm.

The projection time of the projection material refers to the projection time per mold. For example, in the case of molding a tire with 9 molds, projection is preferably performed for a total of 270 seconds to 90 minutes onto the tread molding surface of the 9 molds that mold a single tire.

Note that when projecting projection material onto the tread molding surface of a single mold, the operator can project the projection material more evenly by shifting the projection position while taking into consideration factors such as the shape of the mold.

EXAMPLES

In order to confirm the effects of the present invention, a tire according to an Inventive Example and a tire according to a Comparative Example were produced as described below, and tires according to Conventional Examples were also prepared.

The tires were molded using an aluminum tire mold in which the tread molding surface of the mold was formed by a projection material projecting step using the projection material with the specifications listed in Table 1.

Note that in Table 1, the "projection time" refers to the projection time of the projection material per mold. For each mold, the operator projected projection material onto the tread molding surface for the above projection time while shifting the position. Furthermore, each tire was molded using 9 molds in which the tread molding surface was formed in this way.

TABLE 1

|  |  | Inventive Example | Comparative Example | Conventional Example 1 | Conventional Example 2 |
| --- | --- | --- | --- | --- | --- |
| Projection Material | material | zircon | zircon | alundum | glass bead |
|  | sphericity | 10 (μm) | 20 (μm) | — | — |
|  | average particle diameter | 0.05 to 0.40 (mm) | 0.05 to 0.40 (mm) | 300 (μm) | 300 (μm) |
|  | distribution | at least 50 μm and less than 200 μm: 10% at least 200 μm and less than 300 μm: 80% at least 300 μm and at most 400 μm: 10% | at least 50 μm and less than 200 μm: 10% at least 200 μm and less than 300 μm: 80% at least 300 μm and at most 400 μm: 10% | at least 50 μm and less than 200 μm: 10% at least 200 μm and less than 300 μm: 80% at least 300 μm and at most 400 μm: 10% | at least 50 μm and less than 200 μm: 10% at least 200 μm and less than 300 μm: 80% at least 300 μm and at most 400 μm: 10% |
|  | specific gravity | 6 | 6 | 4 | 2.5 |
|  | Modified Mohs hardness | 9 | 9 | 12 | 6.5 |
| Projecting Conditions | projection time | 3 (min) | 3 (min) | 3 (min) | 3 (min) |
|  | projection pressure | 400 (kPa) | 400 (kPa) | 400 (kPa) | 400 (kPa) |
|  | projection speed | 3 (m/s) | 3 (m/s) | 3 (m/s) | 3 (m/s) |

The reason is that projecting the projection material at 100 kPa or more for at least 30 seconds achieves desired properties evenly on the tread molding surface, whereas projecting the projection material at 1000 kPa or less for 10 minutes or less suppresses damage to the tread molding surface.

Note that the specific gravity and projection pressure of the projection material are adjusted so that the projection speed of the projection material is preferably from 0.3 m/s to 10 m/s and more preferably from 0.5 m/s to 7 m/s.

The above tires, each having a tire size of 205/55R16, were mounted onto an applicable rim, standard internal pressure was applied, and a test was performed to evaluate on-ice performance and on-snow performance.

The evaluation methods were as follows.
<On-Ice Performance>
The coefficient of friction on ice was measured. As test conditions, the load per wheel was 4.3 kN, and the speed was 5 km/h. The results are shown as an index in Table 2, with the value of Conventional Example 1 being 100. A larger index indicates better performance.

<On-Snow Performance>

The coefficient of friction on snow was measured. As test conditions, the load per wheel was 4.3 kN, and the speed was 5 km/h. The results are shown as an index in Table 2, with the value of Conventional Example 1 being 100. A larger index indicates better performance.

The evaluation results are shown in Table 2 below.

TABLE 2

|  | Inventive Example | Comparative Example | Conventional Example 1 | Conventional Example 2 |
|---|---|---|---|---|
| On-Ice Performance | 125 | 98 | 100 | 95 |
| On-Snow Performance | 120 | 100 | 100 | 96 |

As Table 2 shows, the on-ice performance and on-snow performance were better for the tire according to the Inventive Example than for the tires according to the Comparative Example and Conventional Examples 1 and 2.

REFERENCE SIGNS LIST

1: Tread portion
2: Protrusion
3: Cavity
4: Bead portion
4: Bead core
5: Sidewall portion
6: Tread portion
7: Carcass
8: Belt
8a, 8b: Belt layer
9: Protrusion
10: Mold
11: Molding surface
11a: Tread molding surface
11b: Sidewall molding surface
11c: Bead molding surface
20: Tire
T: Road surface

The invention claimed is:

1. A tire mold comprising:
a tread molding surface to mold a tread surface of a tire, at least a portion of the tread molding surface being formed by projecting spherical projection material particles having an average sphericity of 15 μm or less and causing the spherical projection material to collide with said tread molding surface, wherein
the tire mold obtained by the projection material projecting step includes a plurality of hemispherical concavities left from the collisions of the projection material particles along said tread molding surface, so that a plurality of hemispherical protrusions are formed on the tread surface of the tire vulcanized with the tire mold,
wherein the particles of the spherical projection material are caused to collide with the tread molding surface under the same projection pressure and the particles have a particle diameter distribution as follows:
50% to 60% of the spherical projection material having a diameter of at least 200 μm and less than 300 μm, and 10% to 20% of the spherical projection material having a diameter of at least 300 μm and at most 400 μm, and wherein
the tire mold has a Modified Mohs hardness of from 2 to 5, and the spherical projection material has a Modified Mohs hardness which is greater than the tire mold by 3 to 5, and wherein
an average particle diameter of the spherical projection material is from 10 μm to 1 mm, wherein
the sphericity and diameter of individual particles is determined by: finding a diameter of an inscribing circle, which is centered around a center of the particle being measured and touches a point of smallest radius of the particle being measured, and a circumscribing circle, which is centered around the center of the particle being measured and contacts a point of greatest radius of the particle being measured, the difference in diameter between the inscribing circle and circumscribing circle of the particle being measured being the sphericity of the particle being measured, the average diameter of the inscribing circle and circumscribing circle of the particle being measured being the diameter of the particle being measured.

2. The tire mold according to claim 1, wherein the particle diameter distribution further comprises 10% to 20% of the spherical projection material having a diameter of at least 50 μm and less than 200 μm.

3. The tire mold according to claim 1, wherein the spherical projection material has a Modified Mohs hardness of 5 to 9.

4. The tire mold according to claim 1, wherein an average particle diameter of the spherical projection material is from 20 μm to 0.7 mm.

5. The tire mold according to claim 1, wherein an average particle diameter of the spherical projection material is from 30 μm to 0.5 mm.

* * * * *